US012591943B2

(12) United States Patent
Menner et al.

(10) Patent No.: US 12,591,943 B2
(45) Date of Patent: Mar. 31, 2026

(54) SYSTEMS AND METHODS FOR GUIDING PEDESTRIANS TO BALANCE CONGESTION

(71) Applicant: Mitsubishi Electric Research Laboratories, Inc., Cambridge, MA (US)

(72) Inventors: Marcel Menner, Arlington, MA (US); Stefano Di Cairano, Newton, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 210 days.

(21) Appl. No.: 18/224,163

(22) Filed: Jul. 20, 2023

(65) Prior Publication Data

US 2025/0029198 A1     Jan. 23, 2025

(51) Int. Cl.
| | |
|---|---|
| *G08G 1/005* | (2006.01) |
| *B61B 1/02* | (2006.01) |
| *G06Q 90/00* | (2006.01) |
| *G09F 9/30* | (2006.01) |
| *H04W 4/02* | (2018.01) |

(52) U.S. Cl.
CPC .............. *G06Q 90/20* (2013.01); *B61B 1/02* (2013.01); *G09F 9/30* (2013.01); *G08G 1/005* (2013.01); *H04W 4/02* (2013.01)

(58) Field of Classification Search
CPC .. G06Q 90/20; B61B 1/02; G09F 9/30; G08G 1/005; H04W 4/02
USPC ......................................................... 340/910
See application file for complete search history.

(56) References Cited

U.S. PATENT DOCUMENTS

| | | | | |
|---|---|---|---|---|
| 2010/0100324 A1* | 4/2010 | Caminiti | ................. | G01S 19/00 |
| | | | | 701/301 |
| 2011/0191078 A1* | 8/2011 | Davidich | ................ | G06F 30/13 |
| | | | | 703/6 |
| 2012/0105615 A1* | 5/2012 | Davidich | ............... | G06V 20/53 |
| | | | | 348/E7.085 |

(Continued)

OTHER PUBLICATIONS

Vastberg, O. B., Dong, H., & Hu, X. (Jul. 2013). Optimal pedestrian evacuation using model predictive control. In 2013 European Control Conference (ECC) (pp. 1224-1229). IEEE.

(Continued)

*Primary Examiner* — Naomi J Small
(74) *Attorney, Agent, or Firm* — Gene Vinokur

(57) ABSTRACT

A congestion control system configured to guide pedestrians to balance congestion throughout areas of a controlled environment is provided. The congestion control system is operatively connected to a plurality of sensors and a pedestrian guidance device. The sensors are configured to capture measurements corresponding to pedestrian congestion levels at various locations within the controlled environment. These measurements are provided to a congestion control system. The congestion control system uses the measurements to determine pedestrian traffic flow at the various locations of the controlled environment. The congestion control system then uses the measured congestion levels and the determined traffic flow to determine a control command. The control command is provided to the pedestrian guidance device to configure the device to provide a guidance output to the pedestrians of the controlled environment to balance and/or reduce congestion.

19 Claims, 10 Drawing Sheets

(56)     References Cited

U.S. PATENT DOCUMENTS

| | | | | |
|---|---|---|---|---|
| 2014/0309962 A1* | 10/2014 | Bauchot | ............... | A61B 5/6807 |
| | | | | 702/158 |
| 2020/0314116 A1* | 10/2020 | Rodriguez Bravo | ........................ | |
| | | | | H04W 12/121 |
| 2020/0365013 A1* | 11/2020 | Simon | ................... | H04W 76/10 |
| 2022/0254162 A1* | 8/2022 | Felemban | .............. | H04N 7/181 |
| 2023/0015773 A1* | 1/2023 | Jia | ...................... | G06V 10/7747 |
| 2024/0212492 A1* | 6/2024 | Kann | ................... | H04W 4/024 |

OTHER PUBLICATIONS

Colombo, R. M., & Rosini, M. D. (2005). Pedestrian flows and non-classical shocks. Mathematical methods in the applied sciences, 28(13), 1553-1567.

Wu, C., Bayen, A. M., & Mehta, A. (May 2018). Stabilizing traffic with autonomous vehicles. In 2018 IEEE international conference on robotics and automation (ICRA) (pp. 6012-6018). IEEE.

\* cited by examiner

100

Sensor A  160a
Sensor B  160b
Sensor C  160c

140

150

110

120

170

130

200

210 Current Pedestrian Congestion

220 Predict *pedestrian flow over horizon* from current congestion levels

230 Compute Arrow to Guide Pedestrians

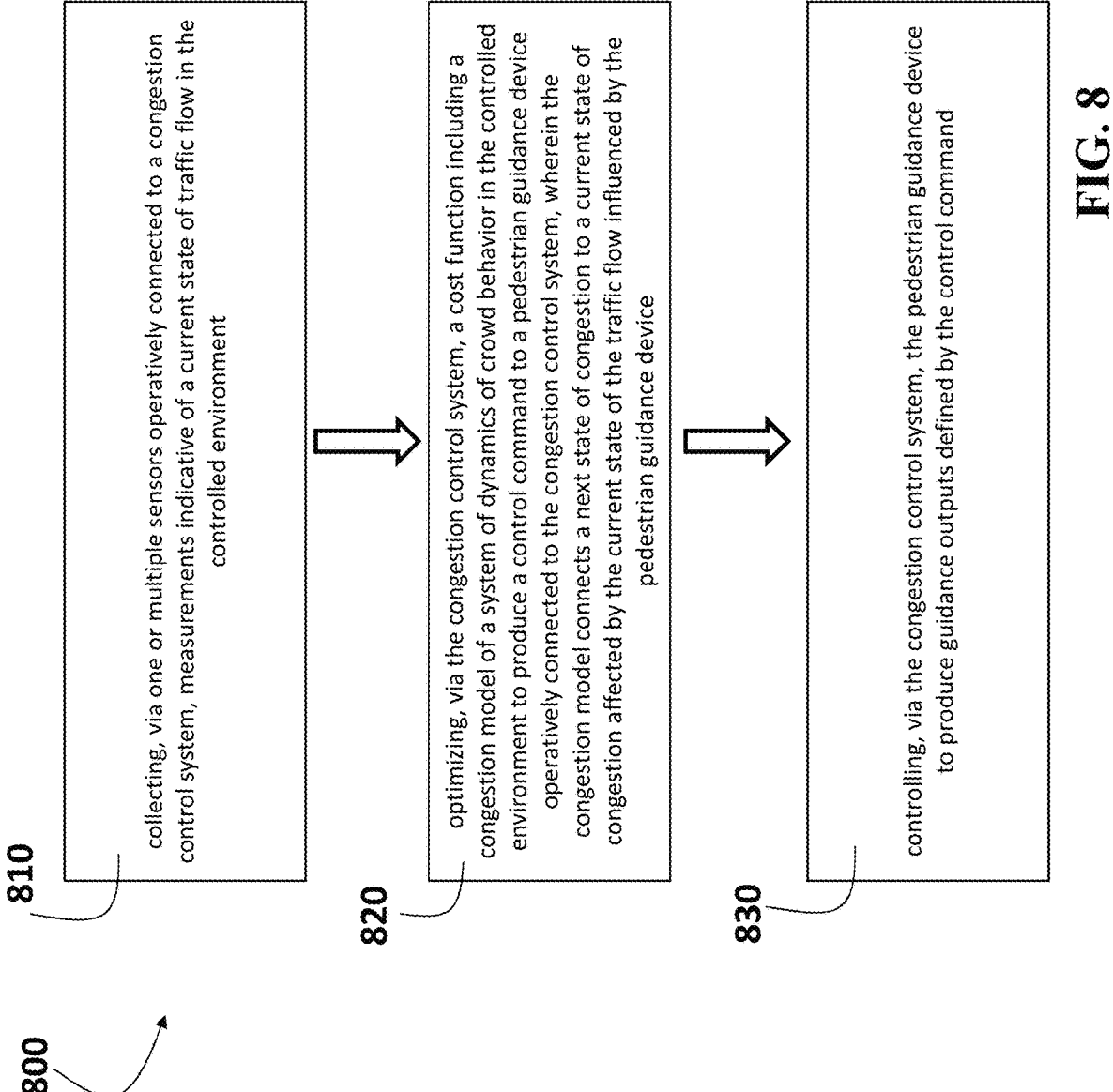

810 collecting, via one or multiple sensors operatively connected to a congestion control system, measurements indicative of a current state of traffic flow in the controlled environment 820 optimizing, via the congestion control system, a cost function including a congestion model of a system of dynamics of crowd behavior in the controlled environment to produce a control command to a pedestrian guidance device operatively connected to the congestion control system, wherein the congestion model connects a next state of congestion to a current state of congestion affected by the current state of the traffic flow influenced by the pedestrian guidance device 830 controlling, via the congestion control system, the pedestrian guidance device to produce guidance outputs defined by the control command

FIG. 8

SYSTEMS AND METHODS FOR GUIDING PEDESTRIANS TO BALANCE CONGESTION

FIELD OF THE DISCLOSURE

The present disclosure relates generally to pedestrian guidance, and more specifically to systems and methods for routing pedestrians to balance congestion levels.

BACKGROUND

Crowd management is an important aspect of ensuring safety in large gatherings and crowded places such as transportation hubs (including train stations, bus stations, airports, etc.). Further, balanced congestion levels across different walkways can increase average pedestrian walking speed and keep traffic flowing efficiently. Balancing congestion levels in train stations is particularly important as an imbalance in congestion levels at the platform can reduce passenger throughput because of varying boarding times at different parts of the train. Imbalanced rider congestion levels can also translate into imbalances in the passenger loads of the individual train cars.

Conventionally, pedestrians traversing a train station were not aware of congestion levels in different areas of the train station or at the different segments of a platform. For example, passengers in a concourse of a train station are often unable to observe the congestion levels at platforms requiring the passengers to walk up or down a flight of stairs. Thus, the pedestrians are unable to make an informed decision to wait at a segment of a platform of lesser congestion.

Accordingly, there is a need to overcome the above-mentioned problem regarding crowd management and congestion balancing. More specifically, there is a need to develop a method and system for guiding pedestrians toward less crowded parts of the platform and/or less crowded walkways to increase boarding efficiency and people throughput.

SUMMARY

The present disclosure is generally directed to a congestion control system configured to guide pedestrians to balance congestion throughout areas of a controlled environment, such as a train station. The congestion control system is operatively connected to a plurality of sensors (such as occupancy sensors, motion sensors, etc.) and a pedestrian guidance device (such as an arrow display, loudspeaker system, lighting system, etc.). The sensors are configured to capture measurements corresponding to pedestrian congestion levels at various locations within the controlled environment. These measurements are provided to a congestion control system. The congestion control system uses the captured measurements to determine pedestrian traffic flow at the various locations of the controlled environment. The congestion control system then uses the measured congestion levels and the determined traffic flow to determine a control command. The control command is provided to the pedestrian guidance device (such as a visual display, loudspeaker system, lighting system, etc.) to configure the device to provide a guidance output to the pedestrians of the controlled environment to balance and/or reduce congestion.

Uncontrolled traffic flow may result in congestion in an environment under control. As used herein, traffic flow and/or pedestrian traffic flow refers to the movement of people within public spaces. Many aspects can influence the traffic flow, such as pedestrian volume, density, and walking speed, as well as signal timing and coordination for controlling the traffic flow. In contrast, congestion refers to the condition of excessive overcrowding or obstruction that hinders the smooth flow of traffic, such as pedestrian traffic. Congestion can occur on roads, highways, intersections, or in public spaces with high pedestrian volumes.

Some embodiments of the present disclosure are based on recognizing that, while many techniques can be used to control the traffic flow, in many practical applications, there is a need to control the congestion, not the traffic flow itself. Hence, additionally or alternatively to the methods designed to control the traffic flow, there is a need for methods designed to control the congestion at one or more locations within the environment.

Some embodiments of the present disclosure are based on recognizing that the traffic flow and congestion can be seen as states of a system of dynamics of crowd behavior in the environment under control. Such a dynamical system is a virtual system of dynamics of the crowd flow and pedestrian circulation, but treating the behavior of the crowd as a dynamical system allows some embodiments to apply control theory to manage congestion.

To that end, it is an object of some embodiments of the present disclosure to provide a model of a system of dynamics of crowd behavior in the area under control. This model may be referred to as the congestion model. The congestion model may be configured to describe the movement of pedestrians into, out of, and within the environment. Additionally or alternatively, it is an object of some embodiments to provide such a model of the system that captures the dynamics of the pedestrian behavior influenced by guidance outputs of a pedestrian guidance device arranged to affect the control area. Examples of the pedestrian guidance devices may include a display device showing configurable signage (such as arrows) for directing pedestrians, a speaker outputting audio instructions, and lighting fixtures influencing the traffic flow with the intensity of the lights. All these outputs of different types of devices can be treated as control inputs to the model of a dynamical system capturing the dynamics of the crowd.

Some embodiments of the present disclosure are based on recognizing that the traffic flow can be seen as a transient state of the dynamical system of crowd behavior, while the congestion can be seen as a steady state of that dynamical system. As used herein, a dynamical system is a system in which a function describes the time dependence of a point in a relevant space. By treating the congestion as a steady state of the system, some embodiments are based on the recognition that the model of congestion should describe the time dependence of the congestion with respect to the traffic flow, rather than the other way around (using a traffic flow model to describe the time dependence of traffic flow with respect to congestion). Such a model is referred to herein as a congestion model.

Hence, in an uncontrolled situation, a congestion model connects the next state of congestion to the current state of congestion affected by the current state of the traffic flow. In the controlled situation (such as an environment including a pedestrian guidance device to guide pedestrians), the congestion model connects the next state of congestion to the current state of congestion affected by the current state of the traffic flow influenced by the guidance outputs of the pedestrian guidance device. According to control theory, the congestion model can be used to optimize the control commands defining the guidance outputs of the output device, thereby controlling the congestion efficiently. This is advantageous because it allows for optimizing the operations of the pedestrian guidance device for the current instance of time and/or within the prediction horizon.

Some further embodiments are based on the understanding that, in contrast with controlling the movement of the vehicles, pedestrians follow routing instructions of the guidance outputs much less accurately. However, this deficiency can be turned into an advantage when the relationship between the routing instructions and the percentage of pedestrians following these instructions is known. This is because, in the setting of congestion control, sometimes only a percentage of the pedestrians need to be diverted from the popular route. That percentage of pedestrians is unknown, but it can also be learned as a function of the traffic flow.

Some embodiments are based on the realization that the percentage of pedestrians that would change the direction based on routing instructions depends on the presentation characteristics of the routing instructions. For example, when the routing instructions are performed by displaying an arrow pointing in a desired walking direction, the display parameters can include one or a combination of intensity, size, color, and visual effects of displaying the arrow on the display device. Some embodiments are based on the recognition that the relationship between the display parameters and the percentage of the pedestrians affected by the displayed routing instruction is not linear and also depends on the traffic flow and the specifics of the controlled environment. For example, for one value of the traffic flow, the intensity of a displayed arrow pointing in a specific direction may affect a different percentage of pedestrians than the same arrow of the same intensity by being displayed during different densities of the traffic flow. However, the function of the guidance output parameterized on traffic flow can be learned for each location and/or each specific controlled environment.

As a result, some embodiments are based on the realization that the routing instructions and the presentation characteristics of the guidance output can be determined based on the current traffic flow using a function learned from historical measurements observed in a specific controlled environment.

Generally, in one aspect, a congestion control system for controlling congestion in a controlled environment is provided. The congestion control system is operatively connected through one or a combination of wired and wireless communication channels to one or multiple sensors. The one or multiple sensors are configured to collect measurements indicative of a traffic flow in the controlled environment.

The congestion control system is also operatively connected to a pedestrian guidance device arranged to affect the controlled environment.

The congestion control system includes at least one processor. The congestion control system further includes a memory having instructions stored thereon that, when executed by the processor, cause the congestion control system to: (1) collect the measurements indicative of a current state of traffic flow in the controlled environment; (2) optimize a cost function including a congestion model of a system of dynamics of crowd behavior in the controlled environment to produce a control command to the pedestrian guidance device, wherein the congestion model connects a next state of congestion to a current state of congestion affected by the current state of the traffic flow influenced by the pedestrian guidance device; and (3) control the pedestrian guidance device to produce a guidance output defined by the control command.

According to an example, the cost function is optimized over different instances of time within a prediction horizon, such that the cost function is a model predictive control function.

According to an example, a plurality of states of the traffic flow within the prediction horizon remain constant.

According to an example, a plurality of states of the traffic flow within the prediction horizon varies. Values corresponding to the plurality of states of the traffic flow at different instances of time within the prediction horizon are defined based on historical data.

According to an example, the congestion model defines the next state of congestion based on a combination of the current state of congestion, the current state of the traffic flow, and a closure term defining a change of the current state of the traffic flow as a function of values of the control command.

According to an example, the closure term may be multiplied with a multiplier between 0 and 1 indicating an effect of the control command on different people. In some examples, the multiplier is fixed for different values of the control command. In other examples, the multiplier is determined based on one or more pedestrian attributes and a learned routing parameter. The learned routing parameter may be based on a measured effect of the control command.

According to an example, the current state of the traffic flow is predicted based on the current state of the congestion. Further, the current state of the traffic flow may be predicted further based on one or more characteristics of the controlled environment. The one or more characteristics of the controlled environment may include a segment traversal time and/or schedule data.

According to an example, the current state of the traffic flow is proportional to the current state of the congestion.

According to an example, the current state of the traffic flow is further predicted based on a predicted state of congestion. The predicted state of congestion may be based on one or more characteristics of the controlled environment and the current state of the congestion.

According to an example, the guidance output includes a routing instruction and a presentation characteristic.

According to an example, the pedestrian guidance device is a display screen configured to show the guidance output.

Generally, in another aspect, a method for controlling congestion in a controlled environment is provided. The method includes collecting, via one or multiple sensors operatively connected to a congestion control system, measurements indicative of a current state of traffic flow in the controlled environment.

The method further includes optimizing, via the congestion control system, a cost function including a congestion model of a system of dynamics of crowd behavior in the controlled environment to produce a control command to a pedestrian guidance device operatively connected to the congestion control system. The congestion model connects a next state of congestion to a current state of congestion affected by the current state of the traffic flow influenced by the pedestrian guidance device.

The method further includes controlling, via the congestion control system, the pedestrian guidance device to produce guidance outputs defined by the control command.

Generally, in a further aspect, a non-transitory computer readable memory embodied thereon a program executable by at least one processor for performing a method for controlling congestion in a controlled environment is provided. The method includes collecting, via one or multiple sensors operatively connected to a congestion control system, measurements indicative of a current state of traffic flow in the controlled environment.

The method further includes optimizing, via the congestion control system, a cost function including a congestion model of a system of dynamics of crowd behavior in the controlled environment to produce a control command to a pedestrian guidance device operatively connected to the congestion control system. The congestion model connects a next state of congestion to a current state of congestion affected by the current state of the traffic flow influenced by the pedestrian guidance device.

The method further includes controlling, via the congestion control system, the pedestrian guidance device to produce guidance outputs defined by the control command.

In various implementations, a processor or controller can be associated with one or more storage media (generically referred to herein as "memory," e.g., volatile and non-volatile computer memory such as ROM, RAM, PROM, EPROM, and EEPROM, floppy disks, compact disks, optical disks, magnetic tape, Flash, OTP-ROM, SSD, HDD, etc.). In some implementations, the storage media can be encoded with one or more programs that, when executed on one or more processors and/or controllers, perform at least some of the functions discussed herein. Various storage media can be fixed within a processor or controller or can be transportable, such that the one or more programs stored thereon can be loaded into a processor or controller so as to implement various aspects as discussed herein. The terms "program" or "computer program" are used herein in a generic sense to refer to any type of computer code (e.g., software or microcode) that can be employed to program one or more processors or controllers.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also can appear in any disclosure incorporated by reference should be accorded a meaning most consistent with the particular concepts disclosed herein.

Other features and advantages will be apparent from the description and the claims.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the various embodiments.

FIG. 8 is a flow chart of controlling congestion in a controlled environment, in accordance with an example.

DETAILED DESCRIPTION

Figure 1A:
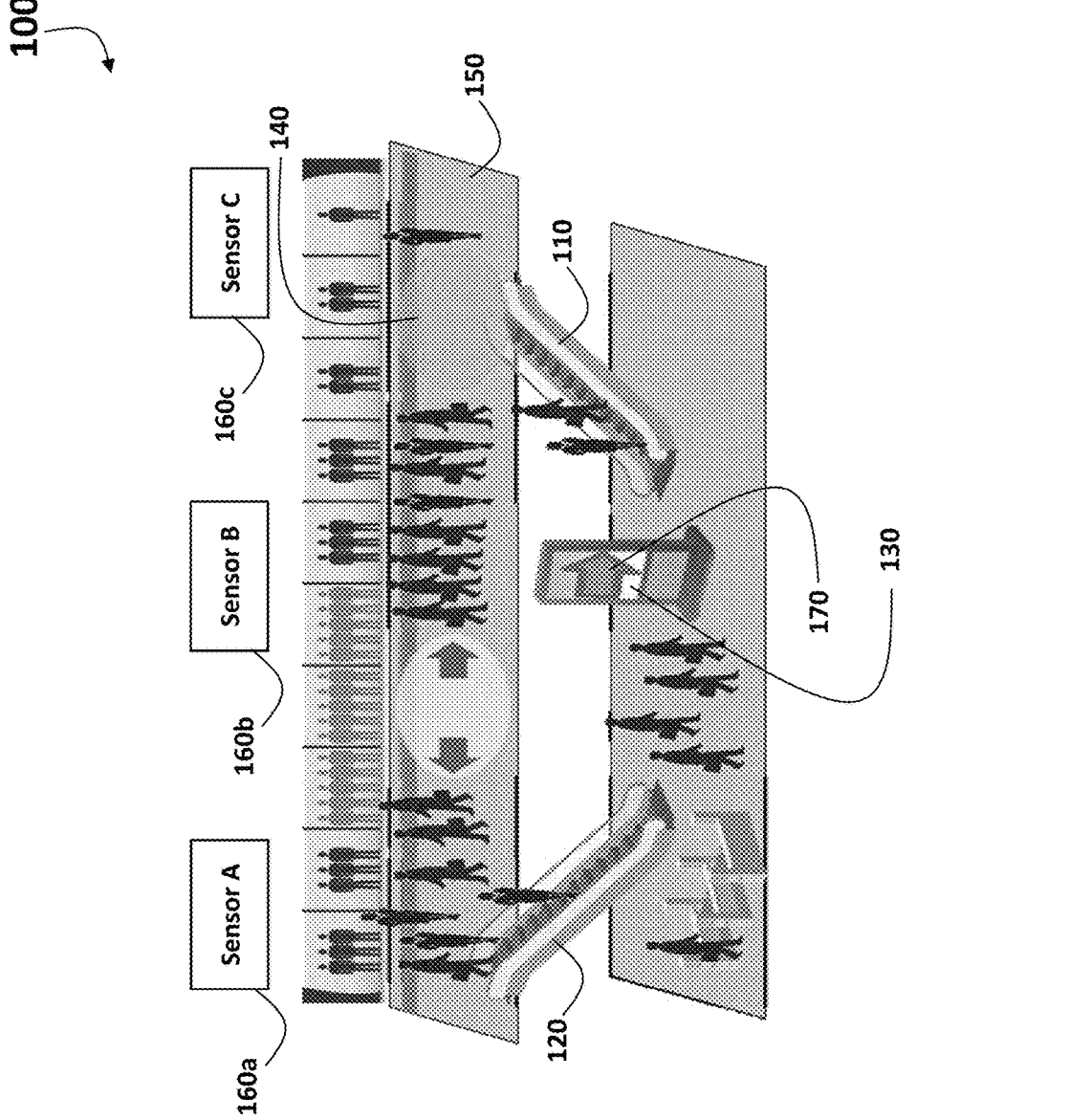
FIG. 1A illustrates a scenario at a train station with an arrow display to guide pedestrians, according to some embodiments of the present disclosure.

In the following description, for purposes of explanation, numerous specific details are set forth in order to provide a thorough understanding of the present disclosure. It will be apparent, however, to one skilled in the art that the present disclosure may be practiced without these specific details. In other instances, apparatuses and methods are shown in block diagram form only in order to avoid obscuring the present disclosure.

As used in this specification and claims, the terms "for example," "for instance," and "such as," and the verbs "comprising," "having," "including," and their other verb forms, when used in conjunction with a listing of one or more components or other items, are each to be construed as open ended, meaning that that the listing is not to be considered as excluding other, additional components or items. The term "based on" means at least partially based on. Further, it is to be understood that the phraseology and terminology employed herein are for the purpose of the description and should not be regarded as limiting. Any heading utilized within this description is for convenience only and has no legal or limiting effect.

The present disclosure is generally directed to a congestion control system configured to guide pedestrians to balance congestion throughout areas of a controlled environment, such as a train station. The congestion control system is operatively connected to a plurality of sensors (such as occupancy sensors, motion sensors, etc.) and a pedestrian guidance device (such as an arrow display, loudspeaker system, lighting system, etc.). The sensors are configured to capture measurements corresponding to pedestrian congestion levels at various locations within the controlled environment. These measurements are provided to a congestion control system. The congestion control system uses the measurements to determine pedestrian traffic flow at the various locations of the controlled environment. The congestion control system then uses the measured congestion levels and the determined traffic flow to determine a control command. The control command is provided to the pedestrian guidance device to configure the device to provide a guidance output to the pedestrians of the controlled environment to balance and/or reduce congestion.

In the example of the controlled environment being a platform of a train station, it is an object of some embodiments of the present disclosure to balance congestion levels on a train platform by using an arrow display to guide the pedestrians. For instance, if a lower congestion region is recognized close to one of the multiple escalators, then the arrow display may display a signal guiding the pedestrians toward the one of the multiple escalators near the lower congestion region.

It is an object of some embodiments to compute the arrow display using current pedestrian congestion levels. If the controlled environment includes an intersection, the current pedestrian congestion levels may be used to compute pedestrian flows across the intersection, where the arrow display is located. The pedestrian flows may be combined with the current pedestrian congestion levels to determine which direction pedestrians should be guided by means of the arrow display. The arrow display may be computed using a mathematical function or optimization problem.

Alternatively, an improved procedure may be used, where predicted pedestrian congestion levels at some future time may be used as additional information to compute the arrow display. For instance, the future time may be ten minutes from present time. For instance, the current pedestrian congestion levels may be used in combination with the predicted pedestrian congestion levels to compute an improved predicted pedestrian flow. The improved predicted pedestrian flow may be more accurate, because it may use predicted values of the predicted pedestrian congestion levels. The improved predicted pedestrian flow may then be used to compute the arrow display by means of the mathematical function or optimization problem.

The congestion control system for computing the arrow display may include at least one processor and a memory storing an intersection layout, routing targets, and a congestion model. The processor may be configured to execute stored instructions in the memory to cause the system to compute the arrow display. The congestion model may relate to how the arrow display changes congestion levels around the intersection.

The congestion model may use a congestion induction effect, which indicates what percentage of pedestrians are re-routed. For example, if the congestion induction effect is 40%, then 40% of pedestrians are expected to change their intended walking direction upon seeing the arrow of full intensity.

The pedestrian flows may be predicted using a mathematical function or an optimization problem using knowledge of characteristics of the intersection. For example, the mathematical function may use the current pedestrian congestion levels and information about the intersection in the train station to compute the pedestrian flows. For instance, the mathematical function may assume that the pedestrian flows across the intersection are proportional to the current pedestrian congestion levels.

Alternatively, the improved procedure may be used for computing the arrow display. In this setting, the improved predicted pedestrian flow uses the predicted pedestrian congestion levels in order to compute the improved predicted pedestrian flow.

The purpose of estimating the pedestrian flows is that the values of the pedestrian flows are used within the congestion model. The congestion model may then be used within a predictive control framework to compute the arrow display. The predictive control framework may use the congestion model and the knowledge of the characteristics of the intersection in order to predict the best arrow display in order to optimize the pedestrian congestion levels. The predictive control framework may use the congestion model for a prediction horizon.

Furthermore, the predictive control framework may use a set of mixed-integer constraints, which can be used to compute the arrow such that it can only be displayed in one direction.

Alternatively, a relaxed predictive control framework may be used. For example, the predictive control framework may be relaxed such that the set of mixed-integer constraints is only enforced strictly for one time step. The relaxed predictive control framework may be beneficial to reduce computational requirements.

Some embodiments are based on displaying a binary intensity of either displaying an arrow with maximum intensity or displaying no arrow. Such a choice of the binary intensity is easy to implement and easy to control. For instance, the arrow display is either turned on or turned off. Additionally or alternatively, some embodiments are based on displaying a varying intensity. Such a choice of the varying intensity may offer more degrees of freedom to route pedestrians to achieve or improve upon the routing targets.

Some embodiments are based on a learning procedure for improving the congestion model using data. The learning procedure may use a model mismatch error between the congestion model and the data. The model mismatch error may then be used to update a congestion induction parameter, which may be used to update the congestion model. In such a setting, the congestion induction parameter may be updated every time a new data sample is collected.

For instance, the learning procedure may use a recursive least squares procedure in order to update the congestion induction parameter. For instance, the congestion induction effect may be computed as a parameterized model using attributes of the pedestrians approaching the intersection. The recursive least squares procedure may use a recursive implementation, in which the congestion induction parameter is updated based on the model mismatch error. The first main advantage of the learning procedure implemented with the recursive least squares procedure is that all collected data points are summarized with a few parameters. The second main advantage of the learning procedure implemented with the recursive least squares procedure is that it is computationally inexpensive. Thus the learning procedure does neither require the memory to be large nor the processor to be powerful.

The learning procedure may be executed every time that the arrow display is shown. Additionally or alternatively, the learning procedure may have an active exploration part. For example, the arrow display may be selected such that the learning procedure can learn the routing parameters more quickly. For example, the learning procedure may display the arrow display that results from a combination of an optimal-arrow computed with the mathematical function or optimization problem and an exploration-measure.

The exploration measure decreases with the number of times that a specific arrow was displayed, and it increases with time. This combination of factors adds an element of exploration, which may be beneficial to learn the congestion model more quickly.

Turning now to the figures, FIG. 1A illustrates a non-limiting example of a controlled environment embodied as a train station 100. In the train station 100, pedestrians must choose between a right escalator 110 and a left escalator 120 in order to reach a train platform 150. It is an object of some embodiments of the present disclosure to balance congestion levels on the train platform 150 by using a pedestrian guidance device 130 (embodied in FIG. 1A as an arrow display) to guide the pedestrians to the right escalator 110 or the left escalator 120 using a guidance output 170. For instance, if a lower congestion region 140 is recognized close to the right escalator 110, then the arrow display may display a guidance output 170 in the form of a signal guiding the pedestrians toward the right escalator 110. The arrow display may be a digital display screen, such as a liquid-crystal display (LCD) screen or a light-emitting diode (LED) screen.

While the example pedestrian guidance device 130 of FIG. 1A is embodied as an arrow display, many other types of pedestrian guidance devices 130 may be implemented. In some examples, the pedestrian guidance device 130 may be a loudspeaker system configured to generate audio commands guiding the pedestrians towards the right escalator 110 or left escalator 120 depending on the observed congestion levels. In other examples, the pedestrian guidance device 130 may be a lighting system including one or more connected luminaires configured to generate lighting outputs to guide the pedestrians. In even further examples, the pedestrian guidance device 130 may generate and wirelessly transmit alerts to guide the pedestrians to all wirelessly enabled devices (such as smartphones, tablet computers, laptop computers, etc.) within a transmission range.

The guidance output 170 may be defined by two aspects, (1) a routing instruction and (2) one or more presentation characteristics. The routing instruction indicates a direction for the pedestrians of the controlled environment to travel. In the example of FIG. 1A, the routing instruction may be considered the direction of the arrow of the arrow display which instructs the pedestrians to use the first escalator 110 or the second escalator 120. If, instead, the pedestrian guidance device 130 is a loudspeaker, the routing instruction may be the information of the audio commands informing the pedestrians as to the recommended travel direction. In other examples, if the pedestrian guidance device 130 is a lighting system, the routing instruction is the directional information conveyed by the configuration of the lighting outputs.

The presentation characteristics of the guidance output 170 define the format of the guidance output 170. For example, if the guidance output 170 is visual (for example, the arrow on the arrow signal or lighting output generated by a lighting system), the presentation characteristics may refer to size, color, intensity, visual effect, etc. If the guidance output 170 is audio (for example, audio commands generated by a loudspeaker), the presentation characteristics may refer to volume or audio effect.

The congestion levels at each segment of the platform are determined based on measurements captured by one or more sensors 160a, 160b, 160c. The sensors 160a, 160b, 160c depicted in FIG. 1A may be any sensor or combination of sensors capable of capturing measurements relevant to a congestion analysis. For example, the sensors 160a, 160b, 160c may include occupancy sensors, motion sensors, proximity sensors, audio sensors (such as microphones), video and/or still image sensors (such as cameras), infrared sensors, etc.

Figure 1B:
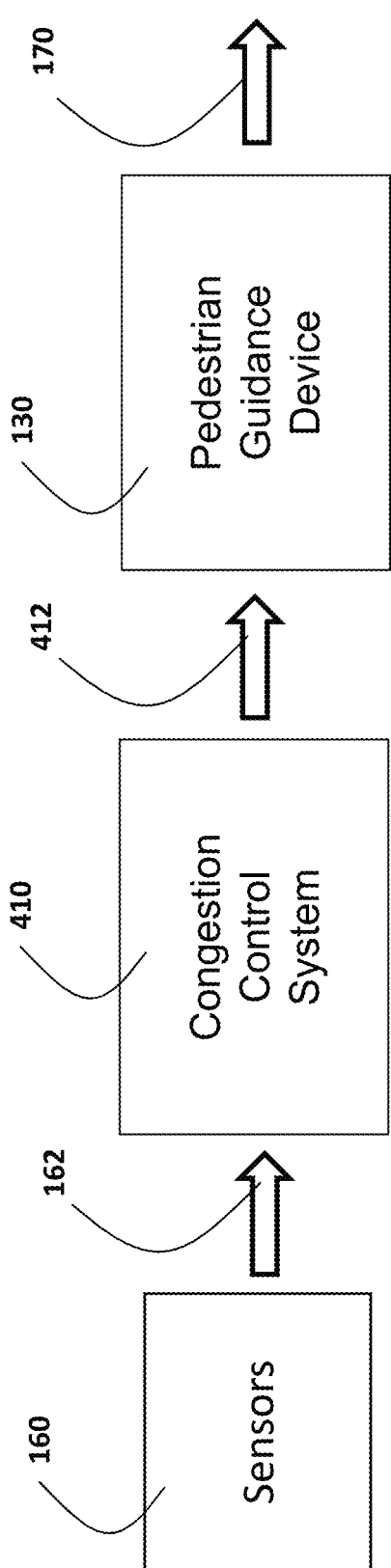
FIG. 1B illustrates a block diagram of data flow between aspects of the present disclosure.

FIG. 1B illustrates a block diagram broadly illustrating the flow of data in the controlled environment of FIG. 1A (embodied as a train station 100). Broadly, the controlled environment of FIG. 1A includes a plurality of sensors 160, a congestion control system 410, and a pedestrian guidance device 130. The sensors 160 are operatively connected to the congestion control system 410 via any combination of wired and/or wireless connection. Similarly, the congestion control system 410 is operatively connected to the pedestrian guidance device 130 via any combination of wired and/or wireless connection. In some examples, the congestion control system 410 is located proximate to the sensors 160 and/or the pedestrian control device 130 within the controlled environment. In other examples, the congestion control system 410 may be located remotely relative to the controlled environment. In these examples, the congestion control system 410 may interact with the sensors 160 and/or the pedestrian control device 130 via cloud computing or other remote networking methods.

As illustrated in FIG. 1B, during operation, the sensors 160 convey measurement data 162 to the congestion control system 410. Broadly, the measurement data 162 is indicative of congestion levels at various segments of the train station 100. The congestion control system 410 processes the measurement data 162 to generate a control command 412. The control command is configured to instruct the pedestrian guidance device 130 to produce a guidance output 170 with routing instructions and presentation characteristics to guide pedestrians within the train station 100 to reduce congestion.

Figure 2:
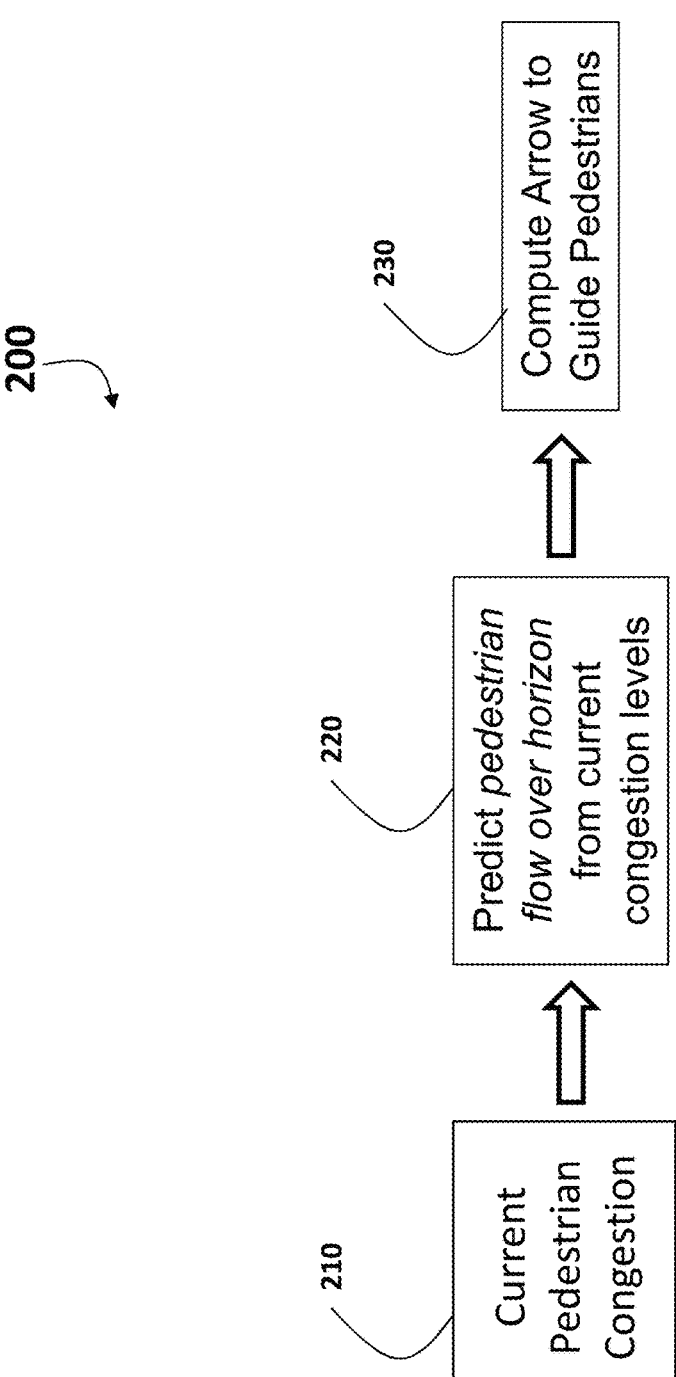
FIG. 2 illustrates a procedure to compute the arrow display of FIG. 1A using current congestion levels, according to some embodiments of the present disclosure.

FIG. 2 illustrates a procedure 200 to control the pedestrian guidance device 130 of FIG. 1A using current pedestrian congestion levels 210. As described above, the current pedestrian congestion levels 210 may be determined based on measurements captured by the one or more sensors 160a, 160b, 160c illustrated in FIG. 1A. The current pedestrian congestion levels 210 may be used to compute pedestrian flows 220 across an intersection, where the pedestrian guidance device 130 is located. The pedestrian flows 220 may be combined with the current pedestrian congestion levels 210 to determine which direction pedestrians should be guided by means of the pedestrian guidance device 130. In the example of FIG. 2, the output is embodied as an arrow displayed by the arrow display of FIG. 1A. The output of the pedestrian guidance device 130 may be computed using a mathematical function or optimization problem 230.

Figure 3:
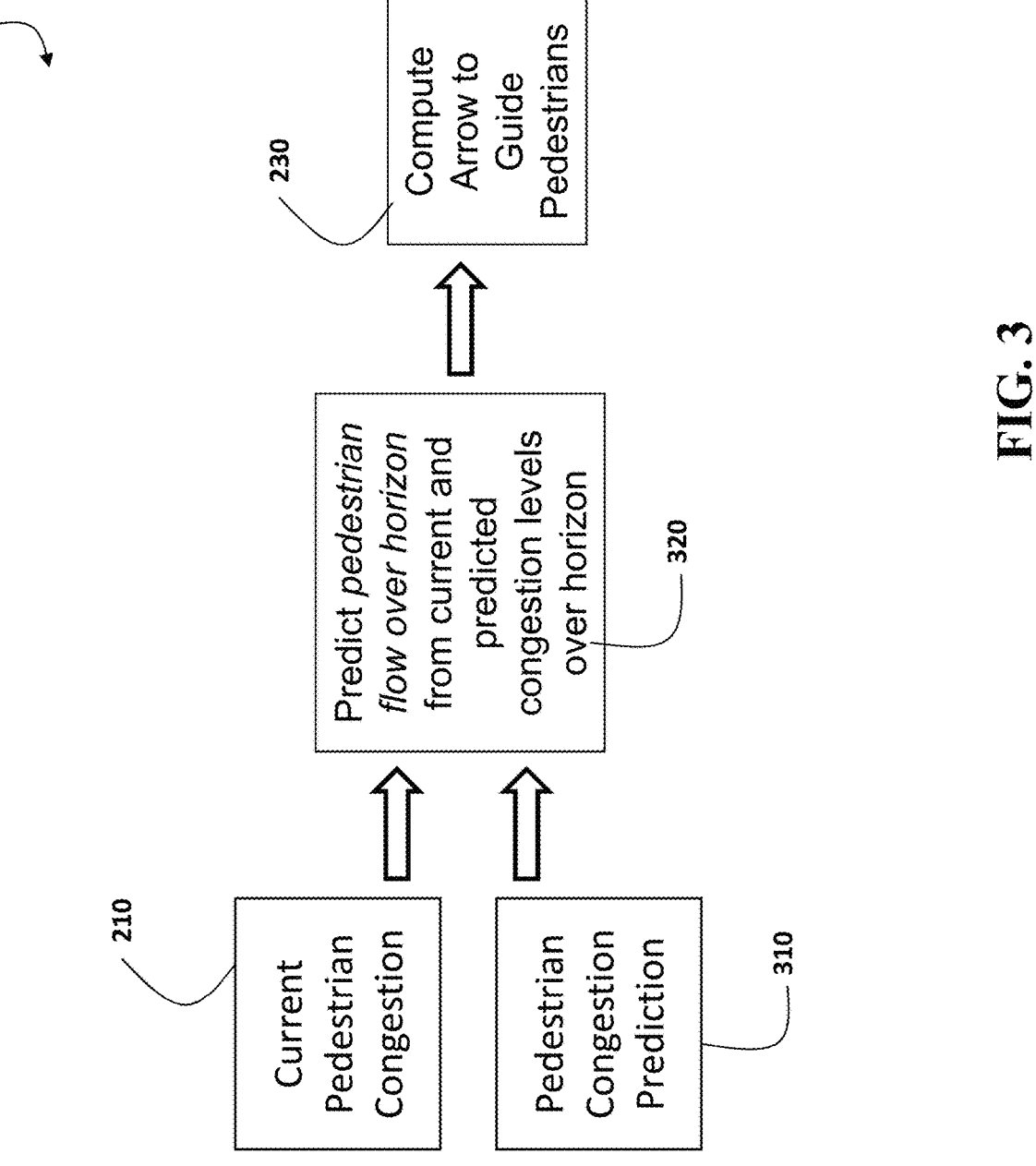
FIG. 3 illustrates a procedure to compute the arrow display of FIG. 1A using current congestion levels and predicted future congestion levels, according to some embodiments of the present disclosure.

Alternatively, an improved procedure 300 may be used, as illustrated in FIG. 3. In FIG. 3, the predicted pedestrian congestion levels 310 at some future time may be used as additional information to compute the output of the pedestrian guidance device 130. In some examples, the future time may be ten minutes from present time. For instance, the current pedestrian congestion levels 210 may be used in combination with the predicted pedestrian congestion levels 310 to compute an improved predicted pedestrian flow 320. The improved predicted pedestrian flow 320 may be more accurate, because it may use predicted values of the predicted pedestrian congestion levels 310. The improved predicted pedestrian flow 320 may then be used to compute the output of the pedestrian guidance device 130 by means of the mathematical function or optimization problem 230.

Figure 4:
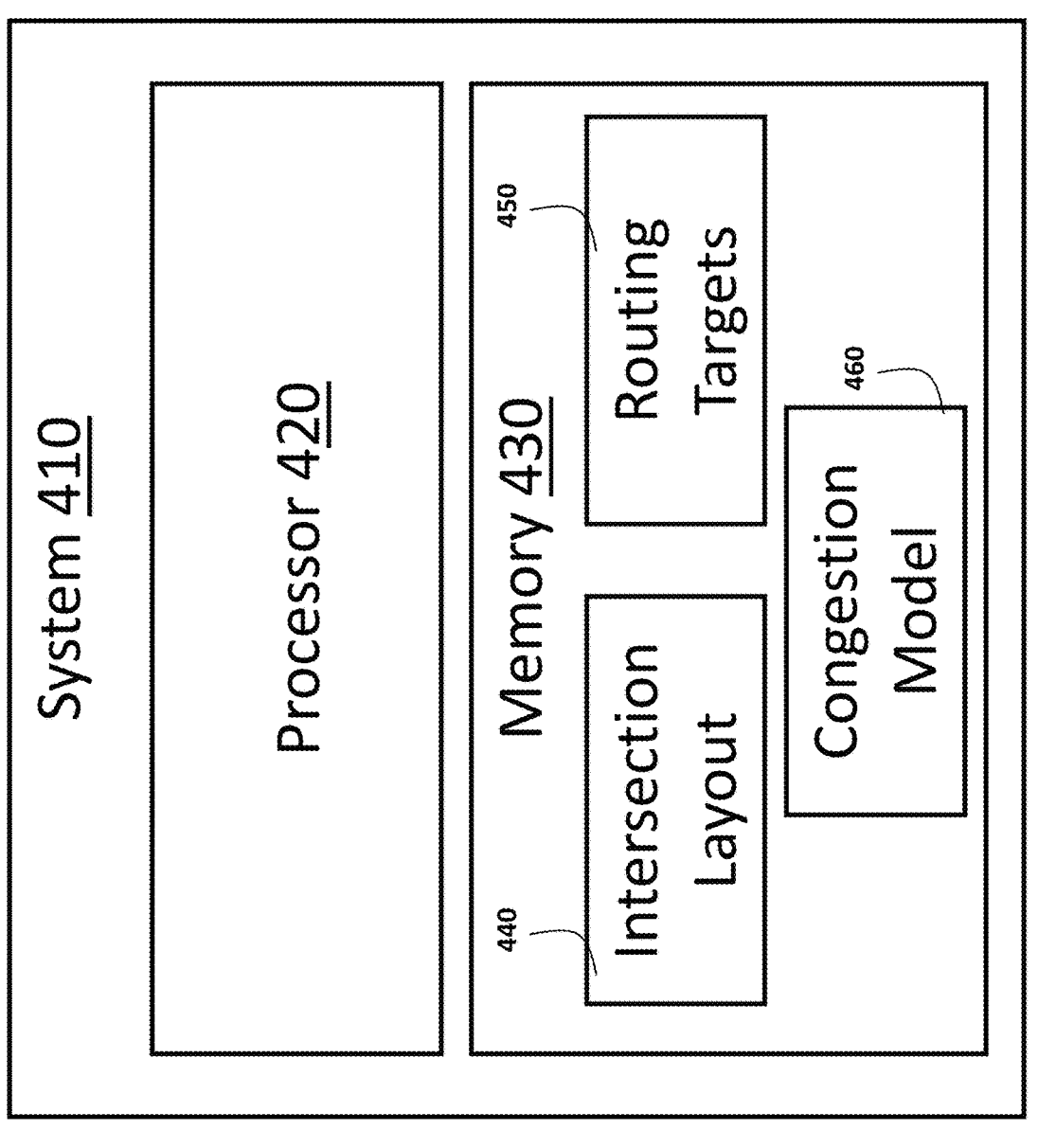
FIG. 4 shows a schematic diagram of the system for computing the arrow display, according to some embodiments of the present disclosure.

FIG. 4 shows a block diagram 400 of a congestion control system 410 for computing the output of the pedestrian guidance device 130, according to some embodiments of the present disclosure. The system 410 includes a processor 420 and a memory 430 storing an intersection layout 440, routing targets 450, and a congestion model 460. The processor 420 is configured to execute stored instructions in the memory 430 to cause the system 410 to compute the arrow display 130. The congestion model 460 may relate to how the pedestrian guidance device 130 changes congestion levels around the intersection.

Figure 5A:
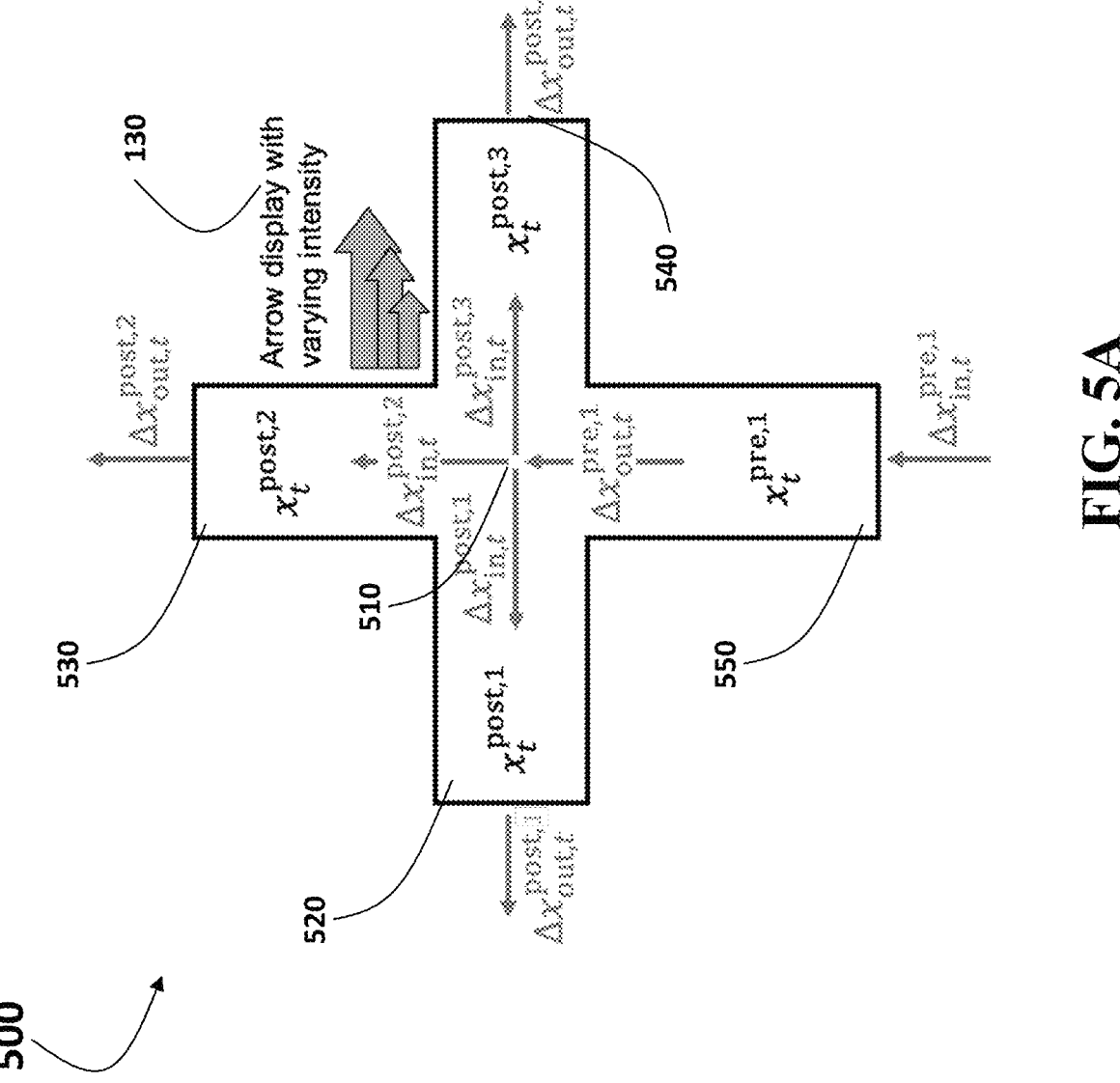
FIG. 5A shows an example of an intersection for guiding pedestrians, according to some embodiments of the present disclosure.

FIG. 5A illustrates an example scenario 500 of an intersection 510 for routing pedestrians using the pedestrian guidance device 130 (embodied as an arrow display). A representation of this intersection 510 may be stored in the memory 430 of the congestion control system 410 as the intersection layout 440 shown in FIG. 4. The intersection 510 may be comprised of a pre-segment 550 defining a path to the intersection 510. The pre-segment 550 may have a specific length. This length is traversed by the pedestrians in order to reach the intersection 510. This length may further determine how long the pedestrians stay in the pre-segment 550. For example, if the pedestrians walk with an average velocity of one meter per second, and the length of the pre-segment 550 is 50 m, then the pedestrians stay in the pre-segment 550 for 50 seconds on average. At the intersection 510, the pedestrians may see the pedestrian guidance device 130. The pedestrians may choose a post-segment after traversing the pre-segment 550 and passing the intersection 510. The pedestrians may choose a first post-segment 520, a second post-segment 530, or a third post-segment 540.

In such an instance, the congestion model 460 may be as illustrated in FIG. 5A, and may be represented by equation 1:

$$\begin{bmatrix} x_{t+1}^{pre} \\ x_{t+1}^{post} \end{bmatrix} = \begin{bmatrix} x_t^{pre} \\ x_t^{post} \end{bmatrix} + \begin{bmatrix} \Delta x_{in,t}^{pre} \\ \Delta x_{in,t}^{post} \end{bmatrix} - \begin{bmatrix} \Delta x_{out,t}^{pre} \\ \Delta x_{out,t}^{post} \end{bmatrix} + r \begin{bmatrix} 0 \\ \overline{B}(\Delta x_{in,t}^{post}) \end{bmatrix} u_t \quad (1)$$

where r represents a congestion induction effect (indicating what percentage of pedestrians are re-routed), $u_t$ represents the guidance output 170 of the pedestrian guidance device 130, $$x_t^{pre}$$

represents the congestion values of the segments (in this case, segment 550) prior to the intersection 510, $$x_t^{post}$$

represents the congestion values of the segments (in this case, segments 520, 530, 540) after the intersection 510, $$\Delta x_{in,t}^{pre}$$

represents the inflow of pedestrians into the segments prior to the intersection 510, $$\Delta x_{in,t}^{post}$$

represents the inflow of pedestrians into the segments after the intersection 510, $$\Delta x_{out,t}^{pre}$$

represents the outflow of pedestrians out of the segments prior to the intersection 510, and $$\Delta x_{out,t}^{post}$$

represents the outflow of pedestrians out of the segments after the intersection 510. For example, $u_t=[0\ 0\ 1]^T$ may represent an arrow of full intensity displayed into the third direction. Further, r=0.4 may indicate that 40% of pedestrians are expected to change their intended walking direction upon seeing the arrow of full intensity. The matrix for predicting the re-routing of pedestrians is $$\overline{B}(\Delta x_{in,t}^{post}).$$

For example, the element in the ith row and jth column of the re-routing matrix $$\overline{B}(\Delta x_{in,t}^{post})$$

may be given by $$[\overline{B}(\Delta x_{in,t}^{post})]_{i,j} = \begin{cases} -\Delta x_{in,t}^{post,i} + \sum_{k=1}^{n_{post}} \Delta x_{in,t}^{post,k} & \text{if } i=j \\ -\Delta x_{in,t}^{post,i} & \text{else} \end{cases} \quad (2)$$

For instance, one objective of the present disclosure may be to make the elements in the vector $$x_{t+1}^{post}$$

as close as possible to each other.

Figure 5B:
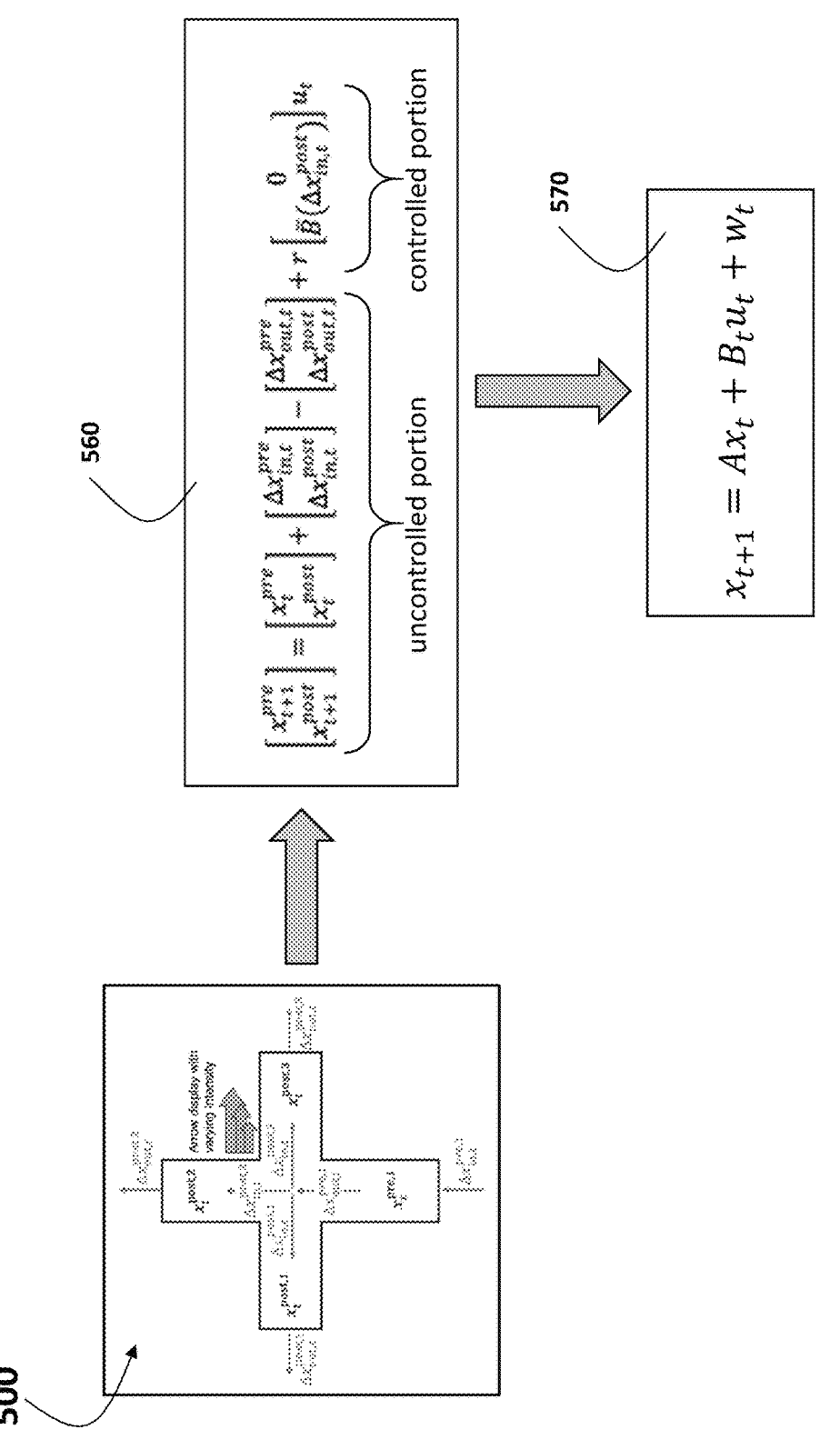
FIG. 5B shows how the congestion model is converted to a control-oriented model, according to some embodiments of the present disclosure.

FIG. 5B illustrates the conceptual idea of converting the example scenario 500 to a control-oriented model 570 in the form of a system dynamics model. The control-oriented model 570 is comprised of a state space model 560, whose states are the congestion values. Thus, such a reformulation enables the control-oriented model 570 to be used with any type of classical control software, such as predictive control. More broadly, $$r \begin{bmatrix} 0 \\ \overline{B}(\Delta x_{in,t}^{post}) \end{bmatrix} u_t$$

may be considered a closure term defining a change of the current state of the traffic flow as a function of values related to a control command to be issued from the congestion control system 410 to the pedestrian guidance device 130. In particular, r may be considered a multiplier with a value between 0 and 1 indicating the effect of the control command on the pedestrians of the environment. In some examples, the values of r is fixed for certain values of the control command.

The intersection 510 may lead to the train platform 150 as shown in FIG. 1A. In this scenario, where the intersection 510 leads to a train platform 150, the pedestrians can only leave the intersection on a train. Thus, in this scenario, $$\Delta x_{out,t}^{post} = 0$$

for all times except when a train leaves.

Alternatively, the intersection 510 may not lead to the train platform 150. In this scenario, the pedestrians can leave the intersection after traversing the length of the segments. In this scenario, $$\Delta x_{out,t}^{post}$$

can be nonzero at all times.

The pedestrian flows 220 may be predicted using a mathematical function or an optimization problem using the knowledge of the intersection 510. For example, the mathematical function may use the current pedestrian congestion levels 210 and information about the intersection in the train station 100 to compute the pedestrian flows 220 as $$\Delta x_t = \begin{bmatrix} \Delta x_{in,t}^{pre} \\ \Delta x_{in,t}^{post} \\ \Delta x_{out,t}^{pre} \\ \Delta x_{out,t}^{post} \end{bmatrix} = f_{ped\text{-}flow}(x_t) \tag{3}$$

with $x_t$ representing the current pedestrian congestion levels 210 with $$x_t = \begin{bmatrix} x_t^{pre} \\ x_t^{post} \end{bmatrix}, \tag{4}$$

$\Delta x_t$ representing a prediction of the pedestrian flows 220, and $f_{ped\text{-}flow}$ is the mathematical function computing the pedestrian flows 220. For instance, the mathematical function $f_{ped\text{-}flow}$ may assume that the pedestrian flows across the intersection 510 are proportional to the current pedestrian congestion levels 210 represented by $$x_t^{post}.$$

In this instance, $$\Delta x_{in,t}^{post}$$

may be predicted as $$\Delta x_{in,t}^{post} = c_{const} \cdot x_t^{post} \tag{5}$$

where $c_{const}$ may be determined using knowledge of the intersection 510, also referred to as characteristics of the controlled environment. For example, if the intersection 510 does not directly lead to the train platform 150, then $c_{const}$ may be chosen as a function of the average walking speed of pedestrians. This choice is reasonable, because in this scenario, the congestion levels on the post-segments 520, 530, 540 are determined based on how long the pedestrians need to traverse the post-segments 520, 530, 540. For example, if the pedestrians stay 2 minutes in the post-segments 520, 530, 540 on average and if $$x_t^{post} = [10 \quad 5 \quad 20]^T,$$

then $$c_{const} = \frac{1}{2}$$

and $$\Delta x_{in,t}^{post} = [5 \quad 2.5 \quad 10]^T.$$

Alternatively, the intersection 510 leads directly to the train platform 150, then the coefficient $c_{const}$ may be chosen as a function of a train schedule (also referred to as schedule data). For example, if the last train has departed 10 minutes ago and if $$x_t^{post} = [10 \quad 5 \quad 20]^T,$$

then $$c_{const} = \frac{1}{10}$$

and $$x_{in,t}^{post} = [1 \quad 0.5 \quad 2]^T.$$

In both of these examples, the unit of $$\Delta x_{in,t}^{post}$$

is pedestrian per minute. Thus, $$\Delta x_{in,t}^{post}$$

represents the number of pedestrians entering the post-segments 520, 530, 540 every minute.

Alternatively, the improved procedure 300 of FIG. 3 may be used for computing the guidance output 170 of the pedestrian guidance device 130. In this setting, the improved predicted pedestrian flow 320 uses the predicted pedestrian congestion levels 310 in order to compute the guidance output 170. For example for a situation where the post-segments 520, 530, 540 lead to the train platform 150, the pedestrian flows may be computed using optimization as $$\min_{\Delta x} \quad c_v^{pre} + c_a^{pre} + c_{train}^{post} \tag{6}$$

$$\Delta x \ge 0 \,\forall\, i = 1, \dots N$$

$$\sum_i^{n_{pre}} \Delta x_{out,i}^{pre,i} = \sum_i^{n_{post}} \Delta x_{out,i}^{post,i} \,\forall\, i = 1, \dots N$$

-continued $$\text{s.t.} \quad \begin{bmatrix} x_{i+1}^{pre} \\ x_{i+1}^{post} \end{bmatrix} = \begin{bmatrix} x_i^{pre} \\ x_i^{post} \end{bmatrix} + \begin{bmatrix} \Delta x_{in,i}^{pre} \\ \Delta x_{in,i}^{post} \end{bmatrix} - \begin{bmatrix} \Delta x_{out,i}^{pre} \\ \Delta x_{out,i}^{post} \end{bmatrix} \forall \, i = 1, \dots N$$

$$\Delta x_{out,i}^{post} = 0 \forall \, t \notin T_{schedule}$$

$$x_0 = x_t$$

with the current pedestrian congestion levels $x_t$, $T_{schedule}$ being the times that a train departs within the prediction horizon time N, and $$c_v^{pre} = \sum_{i=1}^{npre} \sum_{t=\tau_i^{pre}}^{N} \left( \Delta x_{in,t-\tau_i^{pre}}^{pre,i} - \Delta x_{out,t}^{pre,i} \right)^2 \tag{7}$$

$$c_a^{pre} = \sum_{i=1}^{npre} \sum_{t=\tau_i^{pre}}^{N} \left( x_t^{pre,i} - \sum_{k=t-\tau_i^{pre}}^{t} \Delta x_{in,k}^{pre,i} \right)^2$$

$$c_{train}^{post} = \sum_{i=1}^{npre} \sum_{t=1}^{N} \left( x_t^{post,i} - \left( x_{\tau_t}^{post,i} + \sum_{k=\tau_t}^{t} \Delta x_{in,k}^{post,i} \right) \right)^2$$

with $\tau_i \geq 0$ being the time of departure of the train prior to time t, and $$\tau_i^{pre} \geq 0$$

being the time that it takes the average pedestrian to traverse the pre-segments. In equations 6 and 7, $$c_v^{pre}$$

represents the cost for average pedestrian walking speed, $$c_a^{pre}$$

represents the cost for patient accumulation on the segments with continuous outflow, and $$c_{train}^{post}$$

represents the cost for patient accumulation on the segments leading to a platform on the train station (as shown in FIG. 1A).

Alternatively, for a situation where the post-segments 520, 530, 540 do not lead to the train platform 150, the pedestrian flows may be computed using optimization as $$\min_{\Delta x} \quad c_v^{pre} + c_a^{pre} + c_v^{post} + c_a^{post} \tag{8}$$

$$\Delta x \geq 0 \forall \, i = 1, \dots N$$

$$\sum_i^{npre} \Delta x_{out,i}^{pre,i} = \sum_i^{npost} \Delta x_{out,i}^{post,i} \forall \, i = 1, \dots N$$

$$\text{s.t.} \quad \begin{bmatrix} x_{i+1}^{pre} \\ x_{i+1}^{post} \end{bmatrix} = \begin{bmatrix} x_i^{pre} \\ x_i^{post} \end{bmatrix} + \begin{bmatrix} \Delta x_{in,i}^{pre} \\ \Delta x_{in,i}^{post} \end{bmatrix} - \begin{bmatrix} \Delta x_{out,i}^{pre} \\ \Delta x_{out,i}^{post} \end{bmatrix} \forall \, i = 1, \dots N$$

$$x_0 = x_t$$

with the current pedestrian congestion levels $x_t$, and $$c_v^{post} = \sum_{i=1}^{npost} \sum_{t=\tau_i^{post}}^{N} \left( \Delta x_{in,t-\tau_i^{post}}^{post,i} - \Delta x_{out,t}^{post,i} \right)^2 \tag{9}$$

$$c_a^{post} = \sum_{i=1}^{npost} \sum_{t=\tau_i^{post}}^{N} \left( x_t^{post,i} - \sum_{k=t-\tau_i^{post}}^{t} \Delta x_{in,k}^{post,i} \right)^2$$

with $$\tau_i^{post} \geq 0$$

being the time that it takes the average pedestrian to traverse the post-segments.

The purpose of estimating the pedestrian flows $$\Delta x_{in,t}^{post}$$

is that they are used within the congestion model 460. The congestion model 460 may then be used within a predictive control framework of a cost function, such as a model predictive control (MPC)-based algorithm, to compute the guidance output 170 of the pedestrian guidance device 130 (such as an arrow shown on an arrow display).

The predictive control framework may use the congestion model 460 and the knowledge of the intersection 510 in order to predict the best arrow display in order to optimize the pedestrian congestion levels. The congestion control system can then generate a control command based on this best arrow display, and then provide this control command to the arrow display. The predictive control framework may use the congestion model 460 for a prediction horizon of N≥0 as $$\begin{bmatrix} x_1^{pre} \\ x_1^{post} \end{bmatrix} = \begin{bmatrix} x_0^{pre} \\ x_0^{post} \end{bmatrix} + \begin{bmatrix} \Delta x_{in,0}^{pre} \\ \Delta x_{in,0}^{post} \end{bmatrix} - \begin{bmatrix} \Delta x_{out,0}^{pre} \\ \Delta x_{out,0}^{post} \end{bmatrix} + r \begin{bmatrix} 0 \\ \overline{B}(\Delta x_{in,0}^{post}) \end{bmatrix} u_0 \tag{10}$$

$$\begin{bmatrix} x_2^{pre} \\ x_2^{post} \end{bmatrix} = \begin{bmatrix} x_0^{pre} \\ x_0^{post} \end{bmatrix} + \sum_{k=0}^{1} \left( \begin{bmatrix} \Delta x_{in,k}^{pre} \\ \Delta x_{in,k}^{post} \end{bmatrix} - \begin{bmatrix} \Delta x_{out,k}^{pre} \\ \Delta x_{out,k}^{post} \end{bmatrix} \right) - \sum_{k=0}^{1} r \begin{bmatrix} 0 \\ \overline{B}(\Delta x_{in,k}^{post}) \end{bmatrix} u_k$$

$$\vdots$$

$$\begin{bmatrix} x_{t+1}^{pre} \\ x_{t+1}^{post} \end{bmatrix} = \begin{bmatrix} x_0^{pre} \\ x_0^{post} \end{bmatrix} + \sum_{k=0}^{t} \left( \begin{bmatrix} \Delta x_{in,k}^{pre} \\ \Delta x_{in,k}^{post} \end{bmatrix} - \begin{bmatrix} \Delta x_{out,k}^{pre} \\ \Delta x_{out,k}^{post} \end{bmatrix} \right) + \sum_{k=t-\tau_t}^{t} r \begin{bmatrix} 0 \\ \overline{B}(\Delta x_{in,k}^{post}) \end{bmatrix} u_k$$

$$\vdots$$

-continued $$\begin{bmatrix} x_{N+1}^{pre} \\ x_{N+1}^{post} \end{bmatrix} = \begin{bmatrix} x_0^{pre} \\ x_0^{post} \end{bmatrix} + \sum_{k=0}^{N} \left( \begin{bmatrix} \Delta x_{in,k}^{pre} \\ \Delta x_{in,k}^{post} \end{bmatrix} - \begin{bmatrix} \Delta x_{out,k}^{pre} \\ \Delta x_{out,k}^{post} \end{bmatrix} \right) + \sum_{k=t-\tau_N}^{t} {}^r \begin{bmatrix} 0 \\ \overline{B}(\Delta x_{in,k}^{post}) \end{bmatrix} u_k$$

Furthermore, the predictive control framework may use a set of mixed-integer constraints, which can be used to compute the arrow such that it can only be displayed in one direction with $$0 \le u_t^i \le 0 + \delta_t^i,\, \delta_t^i \in \{0, 1\} \qquad (11)$$
$$\sum_{i=1}^{n\,post} \delta_t^i = 1 \qquad \forall\, t = 0, \dots, N.$$

The direction of the arrow can also be applied to conveying directional information for other types of guidance outputs 170 of the pedestrian control device 130, such as audio or lighting.

The predictive control framework may thus be given as $$\min_{\Delta x} \qquad \sum_{t=0}^{N} \sum_{i=1}^{n\,post} \left( x_t^{post,i} - x_{ref}^i \right)^2 \qquad (12)$$

$$(1)$$

$$\text{s.t.} \quad 0 \le u_t^i \le 0 + \delta_t^i,\, \delta_t^i \in \{0, 1\},\, \sum_{i=1}^{n\,post} \delta_t^i = 1,\, \forall\, t = 0, \dots, N$$

$$x_0 = x_t$$

with $$x_{ref}^i$$

being target values for the pedestrian congestion levels.

Alternatively, a relaxed predictive control framework may be used. For example, the predictive control framework may be relaxed such that the set of mixed-integer constraints is only enforced strictly for one time step. In this example, the relaxed predictive control framework may be given as $$\min_{\Delta x} \qquad \sum_{t=0}^{N} \sum_{i=1}^{n\,post} \left( x_t^{post,i} - x_{ref}^i \right)^2 \qquad (13)$$

$$(1)$$

$$\text{s.t.} \quad \begin{array}{c} 0 \le u_t^i \le 0 + \delta_t^i,\, \delta_t^i \in \{0, 1\},\, \sum_{i=1}^{n\,post} \delta_t^i = 1,\, t = 0 \\ 0 \le \sum_{i=1}^{n\,post} u_t^i \le 1 \forall\, t \end{array}$$

$$x_0 = x_t$$

The relaxed predictive control framework may be beneficial to reduce computational requirements.

Figure 6:
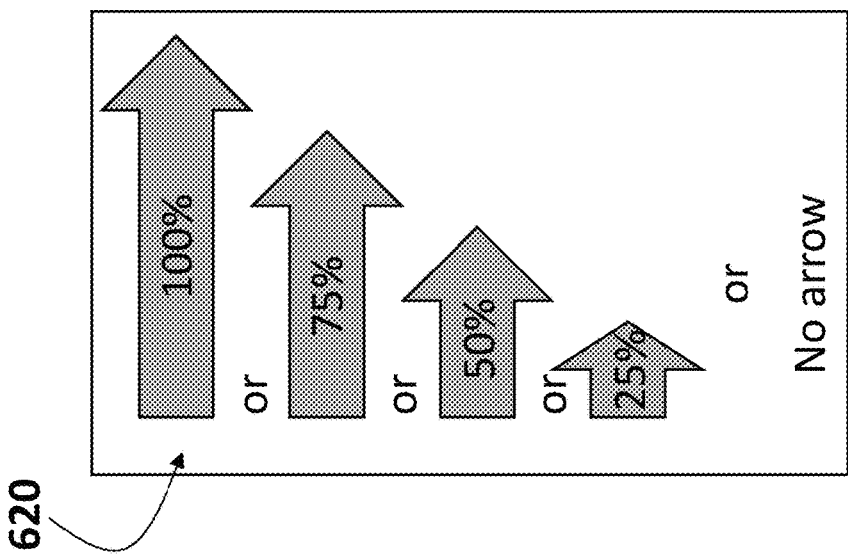
FIG. 6 shows different variations of the arrow displays, according to some embodiments of the present disclosure.
Figure 6:
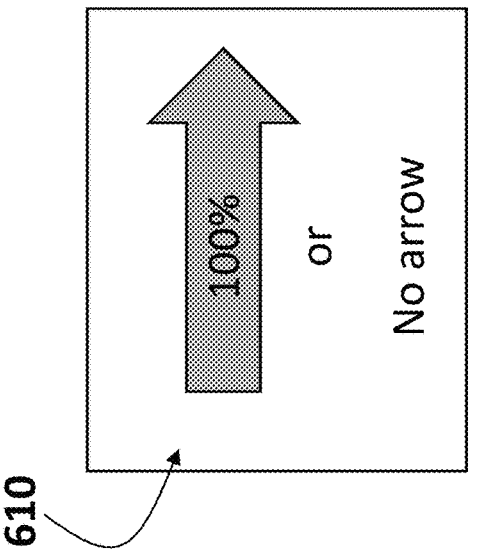

FIG. 6 illustrates variations of the pedestrian guidance device 130 embodied as an arrow display. As seen in FIG. 6, the pedestrian guidance device 130 is configured to generate a guidance output 170 in the form of an arrow. Some embodiments are based on displaying a binary intensity 610 of either displaying an arrow with maximum intensity or displaying no arrow. Such a choice of the binary intensity 610 is easy to implement and easy to control. For instance, the pedestrian guidance device 130 is either turned on or turned off. Additionally or alternatively, some embodiments are based on displaying a varying intensity 620. Such a choice of the varying intensity 620 may offer more degrees of freedom to route pedestrians to achieve or improve upon the routing targets 450.

Figure 7:
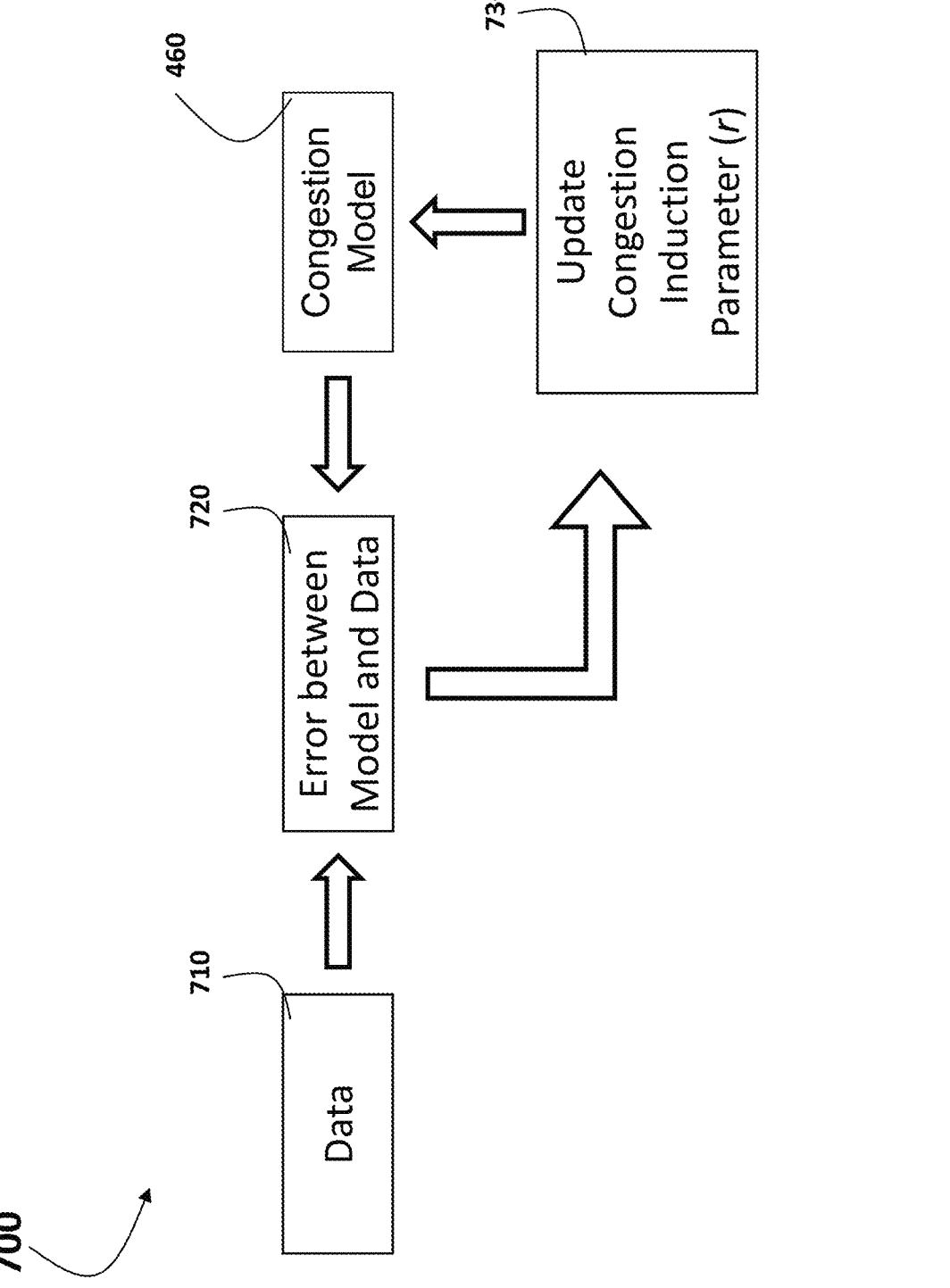
FIG. 7 illustrates a procedure for learning a pedestrian congestion model using data, according to some embodiments of the present disclosure.

FIG. 7 illustrates a learning procedure 700 for the congestion model 460 using data 710. The data 710 represent an actual congestion level in one or more aspects of a controlled environment, while the congestion model 460 generates a predicted congestion level based on a previously measured congestion level, the traffic flow, and the congestion induction effect of the guidance output 170. The learning procedure 700 may use a model mismatch error 720 between the congestion model 460 and the data 710. The model mismatch error 720 may then be used to update the values of the congestion induction parameter (r), also referred to as a multiplier, which may be used to update the congestion model 460. In such a setting, the congestion induction parameter 730 may be updated every time a new data sample is collected.

For instance, the learning procedure 700 may use a recursive least squares procedure in order to update the congestion induction parameter 730. For instance, the congestion induction parameter r may be computed as a parameterized model as $$r = \phi_t^T \theta_t \qquad (14)$$

where $\phi_t$ may relate to attributes of the pedestrians approaching the intersection and $\theta_t$ are routing parameters that are learned using the learning procedure 700. The attributes may be any characteristics or qualities of the pedestrians in the controlled environment. In some examples, the attributes include demographic information, such as age, gender, etc. The recursive least squares procedure may use a recursive implementation, in which the congestion induction parameter 730 is updated based on the model mismatch error 720, which may be computed as $$e_t = y_t - \phi_t^T \theta_t \qquad (15)$$

with $y_t$ being a measured congestion induction effect. The measured congestion induction effect may be computed using the congestion model 460 as $$y_t = \left( \begin{bmatrix} 0 \\ \overline{B}(\Delta x_{in,t}^{post}) \end{bmatrix} u_t \right)^{pinv} \left( \begin{bmatrix} x_{t+1}^{pre} \\ x_{t+1}^{post} \end{bmatrix} - \begin{bmatrix} x_t^{pre} \\ x_t^{post} \end{bmatrix} - \begin{bmatrix} \Delta x_{in,t}^{pre} \\ \Delta x_{in,t}^{post} \end{bmatrix} + \begin{bmatrix} \Delta x_{out,t}^{pre} \\ \Delta x_{out,t}^{post} \end{bmatrix} \right) \qquad (16)$$

where pinv indicates the pseudo inverse of a vector. The routing parameters may then be updated as $$\theta_{t+1} = \theta_t + P_{t+1} \phi_t e_t \qquad (17)$$

with $P_{t+1}$ computed as $$P_{t+1} = \frac{1}{\lambda} P_t - \frac{1}{\lambda} \frac{P_k \phi_t \phi_t^T P_t}{\left(\lambda + \phi_t^T P_t \phi_t\right)} \tag{18}$$

with the forgetting factor $0 < \lambda \leq 1$. The first main advantage of the learning procedure 700 implemented with the recursive least squares procedure is that all collected data points are summarized with a few parameters with $\theta_t$ and $P_t$. The second main advantage of the learning procedure 700 implemented with the recursive least squares procedure is that it is computationally inexpensive. Thus, the learning procedure 700 does neither require the memory 430 to be large nor the processor 420 to be powerful.

Additionally or alternatively, the congestion induction effect (r) 730 may be computed as a parameterized model with a nonlinearity as $$r = s(\rho) \phi_t^T \theta_t \tag{19}$$

where $s(\rho)$ may be a nonlinear function with $\rho$ being the varying intensity 620 of the arrow display as shown in FIG. 6. The nonlinear function $s(\rho)$ may be given by a set of basis functions as $$s(\rho) = \chi(\rho)^T a_t = a_1 \rho^{b_1} + a_2 \rho^{b_2} + a_3 \rho^{b_3} + \ldots + a_n \rho^{b_n} \tag{20}$$

with parameters $a_i$ and $b_i$. The parameters $a_i$ and $b_i$ may be learned using an augmented recursive least squares procedure in combination with the parameters $\theta_t$. The augmented recursive least squares procedure may be based on an augmented model mismatch as $$e_t = y_t - \phi_t^T \theta_t \chi(\rho)^T a_t \tag{21}$$

The parameters may then be updated as $$a_{t+1} = a_t + Q_{t+1} \phi_t^T \theta_t \chi(\rho)^T e_t \tag{22}$$

with $Q_{t+1}$ computed as $$Q_{t+1} = \frac{1}{\lambda} Q_t - \frac{1}{\lambda} \frac{Q_k \left(\phi_t^T \theta_t \chi(\rho)^T\right)^T \phi_t^T \theta_t \chi(\rho)^T Q_t}{\left(\lambda + \phi_t^T \theta_t \chi(\rho)^T Q_t \left(\phi_t^T \theta_t \chi(\rho)^T\right)^T\right)} \tag{23}$$

The learning procedure 700 may alternate between improving the nonlinear function $s(\rho)$ and the linear part of the congestion induction model $$\phi_t^T \theta_t.$$

In this case, the learning procedure 700 may first improve the nonlinear function $s(\rho)$ using the recursive least squares procedure with the currently-best parameters of the linear part of the congestion induction model $\theta_t$. Afterwards, the learning procedure 700 may improve the linear part of the congestion induction model $\theta_t$ given the currently-best nonlinear function $s(\rho)$ using the recursive least squares procedure.

The learning procedure 700 may be executed every time that the guidance output 170 (such as an arrow) of the pedestrian guidance device 130 is shown. Additionally or alternatively, the learning procedure 700 may have an active exploration part. For example, the arrow may be selected such that the learning procedure 700 can learn the routing parameters of the congestion induction parameter 730 more quickly. For example, the learning procedure 700 may display the arrow display that results from a combination of an optimal-arrow $u_t$ computed with the mathematical function or optimization problem 230 and an exploration-measure. For example, the arrow display may use the optimal-arrow as $$u_t^{display} = \underset{u_t \in U}{\mathrm{argmax}} R(u_t) + \sqrt{\frac{2\log t}{N_t(u_t)}} \tag{24}$$

with the exploration measure $$\sqrt{\frac{2\log t}{N_t(u_t)}}$$

with the time index t and $N_t(u_t)$ being the number of times that $u_t$ has been used as the arrow display, and $R(u_t)$ being an expected reward or benefit of displaying $u_t$.

The exploration measure decreases with the number of times that a specific arrow was displayed, and it increases with time. This combination of factors adds an element of exploration, which may be beneficial to learn the congestion model 460 more quickly.

FIG. 8 is a flow chart of a method 800 for controlling congestion in a controlled environment, according to various embodiments of the invention. Referring to FIGS. 1-8, the method 800 includes, in step 810, collecting, via one or multiple sensors operatively connected to a congestion control system, measurements indicative of a current state of traffic flow in the controlled environment.

The method 800 further includes, in step 820, optimizing, via the congestion control system, a cost function including a congestion model of a system of dynamics of crowd behavior in the controlled environment to produce a control command to a pedestrian guidance device operatively connected to the congestion control system. The congestion model connects a next state of congestion to a current state of congestion affected by the current state of the traffic flow influenced by the pedestrian guidance device.

The method 800 further includes, in step 830, controlling, via the congestion control system, the pedestrian guidance device to produce guidance outputs defined by the control command.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements can optionally be present other than the elements specifically identified by the "and/or" clause, whether related or unrelated to those elements specifically identified.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of."

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements can optionally be present other than the elements specifically identified within the list of elements to which the phrase "at least one" refers, whether related or unrelated to those elements specifically identified.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively.

The above-described examples of the described subject matter can be implemented in any of numerous ways. For example, some aspects can be implemented using hardware, software or a combination thereof. When any aspect is implemented at least in part in software, the software code can be executed on any suitable processor or collection of processors, whether provided in a single device or computer or distributed among multiple devices/computers.

The present disclosure can be implemented as a system, a method, and/or a computer program product at any possible technical detail level of integration. The computer program product can include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some examples, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to examples of the disclosure. It will be understood that each block of the flowchart illustrations and/or block diagrams, and combinations of blocks in the flowchart illustrations and/or block diagrams, can be implemented by computer readable program instructions.

The computer readable program instructions can be provided to a processor of a, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various examples of the present disclosure. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Other implementations are within the scope of the following claims and other claims to which the applicant can be entitled.

While various examples have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the examples described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific examples described herein. It is, therefore, to be understood that the foregoing examples are presented by way of example only and that, within the scope of the appended claims and equivalents thereto, examples can be practiced otherwise than as specifically described and claimed. Examples of the present disclosure are directed to each individual feature, system, article, material, and/or method described herein. In addition, any combination of two or more such features, systems, articles, materials, and/or methods, if such features, systems, articles, materials, and/or methods are not mutually inconsistent, is included within the scope of the present disclosure.

What is claimed is:

1. A congestion control system for controlling congestion in a controlled environment, wherein the congestion control system is operatively connected through one or a combination of wired and wireless communication channels to one or multiple sensors configured to collect measurements indicative of a traffic flow in the controlled environment and to a pedestrian guidance device arranged to affect the controlled environment, the congestion control system comprising: at least one processor; and a memory having instructions stored thereon that, when executed by the processor, cause the congestion control system to:
collect the measurements indicative of a current state of traffic flow in the controlled environment;
optimize a cost function including a congestion model of a system of dynamics of crowd behavior in the controlled environment to produce a control command to the pedestrian guidance device, wherein the congestion model includes a closure term multiplied by a multiplier between 0 and 1 representing an estimated probability that a pedestrian will follow a guidance output of the pedestrian guidance device, and wherein the congestion model connects a next state of congestion to a current state of congestion affected by the current state of the traffic flow influenced by the pedestrian guidance device; and
control the pedestrian guidance device to produce the guidance output defined by the control command.

2. The congestion control system of claim 1, wherein the cost function is optimized over different instances of time within a prediction horizon, such that the cost function is a model predictive control function.

3. The congestion control system of claim 2, wherein a plurality of states of the traffic flow within the prediction horizon remain constant.

4. The congestion control system of claim 2, wherein a plurality of states of the traffic flow within the prediction horizon varies.

5. The congestion control system of claim 4, wherein values corresponding to the plurality of states of the traffic flow at different instances of time within the prediction horizon are defined based on historical data.

6. The congestion control system of claim 1, wherein the congestion model defines the next state of congestion based on a combination of the current state of congestion, the current state of the traffic flow, and the closure term defines a change of the current state of the traffic flow as a function of values of the control command.

7. The congestion control system of claim 1, wherein the multiplier is fixed for different values of the control command.

8. The congestion control system of claim 1, wherein the multiplier is determined based on one or more pedestrian attributes and a learned routing parameter.

9. The congestion control system of claim 8, wherein the learned routing parameter is based on a measured effect of the control command.

10. The congestion control system of claim 6, wherein the current state of the traffic flow is predicted based on the current state of the congestion.

11. The congestion control system of claim 10, wherein the current state of the traffic flow predicted further based on one or more characteristics of the controlled environment.

12. The congestion control system of claim 11, wherein the one or more characteristics of the controlled environment include a segment traversal time and/or schedule data.

13. The congestion control system of claim 10, wherein the current state of the traffic flow is proportional to the current state of the congestion.

14. The congestion control system of claim 10, wherein the current state of the traffic flow is further predicted based on a predicted state of congestion.

15. The congestion control system of claim 14, wherein the predicted state of congestion is based on one or more characteristics of the controlled environment and the current state of the congestion.

16. The congestion control system of claim 1, wherein the guidance output includes a routing instruction and a presentation characteristic.

17. The congestion control system of claim 1, wherein the pedestrian guidance device is a display screen configured to show the guidance output.

18. A method for controlling congestion in a controlled environment, comprising:

collecting, via one or multiple sensors operatively connected to a congestion control system, measurements indicative of a current state of traffic flow in the controlled environment;

optimizing, via the congestion control system, a cost function including a congestion model of a system of dynamics of crowd behavior in the controlled environment to produce a control command to a pedestrian guidance device operatively connected to the congestion control system, wherein the congestion model includes a closure term multiplied by a multiplier between 0 and 1 representing an estimated probability that a pedestrian will follow guidance outputs of the pedestrian guidance device, and wherein the congestion model connects a next state of congestion to a current state of congestion affected by the current state of the traffic flow influenced by the pedestrian guidance device; and controlling, via the congestion control system, the pedestrian guidance device to produce guidance outputs defined by the control command.

19. A non-transitory computer readable memory embodied thereon a program executable by at least one processor for performing a method for controlling congestion in a controlled environment, comprising:

collecting, via one or multiple sensors operatively connected to a congestion control system, measurements indicative of a current state of traffic flow in the controlled environment;

optimizing, via the congestion control system, a cost function including a congestion model of a system of dynamics of crowd behavior in the controlled environment to produce a control command to a pedestrian guidance device operatively connected to the congestion control system, wherein the congestion model includes a closure term multiplied by a multiplier between 0 and 1 representing an estimated probability that a pedestrian will follow guidance outputs of the pedestrian guidance device, and wherein the congestion model connects a next state of congestion to a current state of congestion affected by the current state of the traffic flow influenced by the pedestrian guidance device; and controlling, via the congestion control system, the pedestrian guidance device to produce guidance outputs defined by the control command.

* * * * *